United States Patent
Tomiyama et al.

(10) Patent No.: US 8,685,495 B2
(45) Date of Patent: Apr. 1, 2014

(54) METHOD FOR MANUFACTURING MULTILAYER INFORMATION RECORDING MEDIUM

(75) Inventors: Morio Tomiyama, Nara (JP); Yuuko Tomekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 395 days.

(21) Appl. No.: 13/001,167

(22) PCT Filed: Jun. 25, 2009

(86) PCT No.: PCT/JP2009/002920
§ 371 (c)(1),
(2), (4) Date: May 26, 2011

(87) PCT Pub. No.: WO2009/157203
PCT Pub. Date: Dec. 30, 2009

(65) Prior Publication Data
US 2011/0223345 A1    Sep. 15, 2011

(30) Foreign Application Priority Data

Jun. 26, 2008 (JP) ............................. P 2008-166806

(51) Int. Cl.
*B05D 1/40* (2006.01)
*B05D 3/12* (2006.01)
*B05D 1/18* (2006.01)
*B05C 13/00* (2006.01)
*B05C 11/00* (2006.01)
*B05C 13/02* (2006.01)

(52) U.S. Cl.
USPC ............................. 427/345; 427/430.1; 118/61

(58) Field of Classification Search
USPC ............................................ 427/487
See application file for complete search history.

(56) References Cited

U.S. PATENT DOCUMENTS 6,829,050 B2 * 12/2004 Ikeda et al. ............... 356/400
7,497,916 B2 * 3/2009 Hayashi et al. ............ 156/64
(Continued)

FOREIGN PATENT DOCUMENTS

EP    1 187 122        3/2002
EP    1187122 A2 *     3/2002
(Continued)

OTHER PUBLICATIONS

International Search Report issued Aug. 18, 2009 in International (PCT) Application No. PCT/JP2009/002920.

(Continued)

*Primary Examiner* — Dah-Wei D Yuan
*Assistant Examiner* — Kristen A Dagenais
(74) *Attorney, Agent, or Firm* — Wenderoth, Lind & Ponack, L.L.P.

(57) ABSTRACT

A substrate formed of an organic-inorganic hybrid material and provided with a reinforcement member in an inner periphery portion is used, as a signal transfer substrate, in a method for procuring a multilayer information recording medium having "n" information recording layers ("n" is an integer of two or more), the method including: applying an ultraviolet curable resin on a "k"th information recording layer ("k" is an integer of from 1 to (n−1)); bonding the signal transfer substrate having a signal surface including a concavo-convex shaped signal portion, to the applied resin, with the signal surface facing the resin; curing the resin by applying an ultraviolet ray to the resin from the substrate side while the substrate is bonded to the resin; and peeling the substrate from the cured resin by warping the inner periphery portion of the substrate. This method enables the signal transfer substrate to be used repeatedly.

6 Claims, 6 Drawing Sheets

(56) References Cited

U.S. PATENT DOCUMENTS

2002/0159177 A1* 10/2002 Aoki et al. .................. 360/47
2004/0200368 A1   10/2004 Ogino et al.
2005/0053752 A1*  3/2005 Komaki ..................... 428/64.4

FOREIGN PATENT DOCUMENTS

| | | |
|---|---|---|
| EP | 2 077 555 | 7/2009 |
| JP | 11-58401 | 3/1999 |
| JP | 2003-85839 | 3/2003 |
| JP | 2004-288845 | 10/2004 |
| JP | 2004288845 A * | 10/2004 |
| JP | 3763763 | 1/2006 |
| JP | 2006-338844 | 12/2006 |
| JP | 2006338844 A * | 12/2006 |
| WO | 2008/059676 | 5/2008 |

OTHER PUBLICATIONS

English translation of International Preliminary Report on Patentability mailed Mar. 10, 2011 in International (PCT) Application No. PCT/JP2009/002920.

* cited by examiner

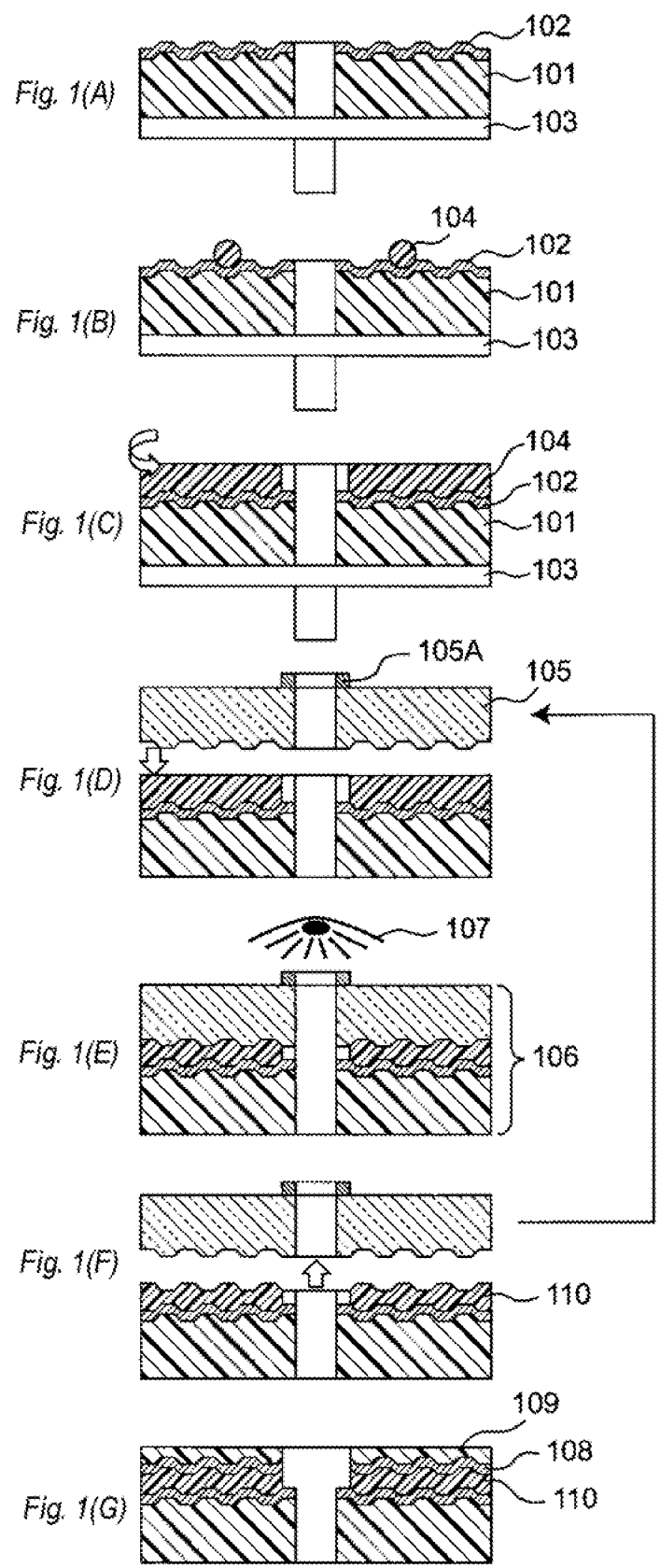

201
202

0.5nm 0.5nm

US 8,685,495 B2

METHOD FOR MANUFACTURING MULTILAYER INFORMATION RECORDING MEDIUM

TECHNICAL FIELD

The present invention is related to a method for producing a multilayer information recording medium for the purpose of reproduction or recording/reproduction of information, which has a plurality of information recording layers.

BACKGROUND ART

Recently, an amount of information required by information equipment and audio and video equipment is increasing. This causes attention to an information recording medium (hereinafter referred to merely as a "recording medium" or a "medium") such as an optical disc which is advantageous in data accessibility, large-volume date storage and downsizing of equipment, and a recording density of the medium is increasing. For example, an optical head wherein a wavelength of laser beam is about 400 nm and a collecting lens for focusing the laser beam has a numerical aperture (NA) of 0.8 has been already used as a means for increasing the recording density of the optical disc. The use of this optical head makes it possible to record information of about 25 GB on a single-layer optical recording medium (which is the medium having a single recording layer) and record information of about 50 GB on the optical recording medium having two recording layers (see, for example, Patent Literature 1).

A structure and a production method of a conventional multilayer information recording medium described in Patent Literature 1 are described below with reference to FIGS. 5 and 6.

FIG. 5 is a cross-sectional view of the conventional multilayer information recording medium. This multilayer information recording medium consists of:

a first signal substrate 601 wherein an signal portion having pits and a groove and so on constructed by concavo-convex shape formed on one surface by transfer;

a first thin film layer 602 which is located on the concavo-convex shaped surface of the first signal substrate 601 on which surface is formed;

a second signal substrate 603 wherein a signal portion having the pits and the guide groove and so on constructed by the concavo-convex shape are formed by transfer on a surface opposite to a surface which is bonded to the first thin film layer 602;

a second thin film layer 604 which is located on the concavo-convex shaped surface of the second signal substrate 603 is formed; and a transparent layer 605 which is formed so as to cover the second thin film layer 604. The first signal substrate 601 is formed of a resin material such as polycarbonate or polyolefin by injection compression molding or the like. During this molding, the signal portion such as pits and guide groove and so on are formed, on one side of the first signal substrate 601, as the concavo-convex shape by transfer. A thickness of the first signal substrate is about 1.1 mm.

Both of the first thin film layer 602 and the second thin film layer 604 include a recording film and a reflective film which are formed by a sputtering method or a vapor deposition method or the like on the signal portion-formed surfaces (signal surfaces) of the first signal substrate 601 and the second signal substrate 603. A material which exhibits an effective reflectance relative to the laser beam having a wavelength of about 400 nm is employed as the material for the reflective film. Such material is, for example, a metal material such as a silver alloy or aluminum.

The material for the recording film is selected depending on whether the recording medium is made a rewritable type or a write-once type. The recording film for the rewritable-type recording medium is formed selecting a material such that data can be recorded and erased two or more times. Specifically, a recording material such as GeSbTe or AgInSbTe is used. The recording film for the write-once-type recording medium is formed selecting a material which changes irreversibly such that the recording can be made only once. Specifically, TeOPd is a representative material.

The signal substrate 603 is formed by forming a layer using an ultraviolet curable resin by a spin coat method and then transferring the concavo-convex shape (the signal portion) such as the pits and the guide groove using a signal transfer substrate. The signal transfer substrate is a substrate wherein the concavo-convex shape such as the pits and the guide groove is formed on one side thereof similarly to the first signal substrate 601. Specifically, the signal transfer substrate is a substrate which is provided with a transfer surface having a signal surface wherein the concavo-convex shape corresponding to the signal portion to be formed on the second signal substrate 603 is formed. The second signal substrate 603 is formed by contacting the signal transfer substrate with the ultraviolet curable resin with the signal surface thereof facing the first signal substrate 601 followed by curing the ultraviolet curable resin and then peeling the signal transfer substrate.

The transparent layer 605 is made from a material which is transparent to a recording and reproduction light (that is, which has a high transmittance) and has a thickness of about 0.1 mm. A light curable resin or an adhesive such as a pressure-sensitive adhesive may be used as a material for the transparent layer 605. Specifically, the transparent layer 605 may be formed by, for example, applying an ultraviolet curable resin on the second thin film layer 604 by a spin coat method. The information is recorded on and reproduced from the multilayer information recording medium manufactured in this manner by allowing a recording and reproduction laser beam to enter from the transparent layer 605 side.

Cross-sectional views of the respective steps in the conventional production method of the multilayer information recording medium are shown in FIGS. 6(A) to (G). The conventional production method of multilayer information recording medium is described in detail with reference to these drawings.

Firstly, a first thin film layer 702 including a recording film and a reflective film is formed by a method such as sputtering or vapor deposition on a signal surface of a first signal substrate 701. The first signal substrate 701 is fixed to a rotatable table 703. The fixation is made by applying vacuum on the surface which is opposite to the surface where the first thin film layer 702 is formed (see FIG. 6(A)).

An ultraviolet curable resin 704 is applied to a desired position concentrically with the first signal substrate 701 (that is, in a circular pattern having a predetermined diameter) from a dispenser in order that a second signal substrate which is a resin layer (see FIG. 6(B)).

Next, the rotatable table 703 is rotated such that the ultraviolet curable resin 704 is spread toward an outer periphery into a film (that is, the application by the spin coat method is conducted) (see FIG. 6(C)). Further, extra resin and bubbles are removed by a centrifugal force exerted to the ultraviolet curable resin 704 during the rotation, which results in the formation of a thin layer. The thickness of the formed layer, that is, the second signal substrate 710 is adjusted to a desired thickness by arbitrarily selecting a viscosity of the ultraviolet curable resin 704, a rotation number, a rotation time and an atmosphere (a temperature and a humidity) during the rotation.

A signal transfer substrate 705 is overlaid on the thin-film ultraviolet curable resin 704 (see FIG. 6(D)). The signal transfer substrate 705 has a surface (signal surface) wherein the pits and the guide groove are formed as the concavo-convex shape similarly to the first signal substrate 701. The signal transfer substrate 705 is made of a material such as polycarbonate or polyolefin. The signal transfer substrate, 705 is overlaid such that the signal surface thereof and the signal surface of the first signal substrate 701 face each other. The overlaying step is preferably conducted under vacuum atmosphere in order to prevent the bubbles to be immixed between the signal transfer substrate 705 and the ultraviolet curable resin 704.

A multilayer structure 706 wherein the first signal substrate 701, the first thin film layer 702, the ultraviolet curable resin 704 and the signal transfer substrate 705 are integrated is irradiated with an ultraviolet ray which is applied from the signal transfer substrate 705 side in order that the ultraviolet curable resin 704 located between the two signal surfaces is cured (see FIG. 6(E)). The ultraviolet ray is applied by an ultraviolet ray irradiator 707. The reason why the ultraviolet ray is applied from the signal transfer substrate 705 is that the material, such as polycarbonate or polyolefin, which constitutes the signal transfer substrate 705 allows the ultraviolet ray to pass therethrough to some extent and to reach the ultraviolet ray to the ultraviolet curable resin 704.

After the ultraviolet curable resin 704 has been cured, the signal transfer substrate 705 is peeled at an interface between the ultraviolet curable resin 704 and the substrate 705, whereby the second signal substrate 710 is formed wherein the signal surface is formed by transfer (see FIG. 6(F)).

A second thin film layer 708 which includes the recording film and the reflective film is formed on the signal surface of the second signal substrate 710 by a method such as sputtering or vapor deposition. Finally, a transparent layer 709 which is almost transparent to the recording and reproduction light (that is, which has a high transmittance) is formed by, for example, spin-coating the ultraviolet curable resin followed by curing the resin by irradiation of the ultraviolet ray (see FIG. 6(G)).

As described above, in the conventional production method of the multilayer information recording medium, the second signal substrate is formed by a method wherein the ultraviolet curable resin is cured by being irradiated with the ultraviolet ray which has passed through the signal transfer substrate. For this reason, it is necessary to use the signal transfer substrate formed of a material which has a sufficiently high ultraviolet-ray transmittance (such as polycarbonate or polyolefin).

BACKGROUND ART LITERATURE

Patent Literature

Patent Literature 1: JP 3763763 B
Patent Literature 2: JP 2003-85839 A

It is desirable that the above-mentioned signal transfer substrate used for the production of the information recording medium is used repeatedly from the viewpoints of production cost and productivity. However, since polycarbonate and polyolefin constituting the signal transfer substrate change in property due to the absorption of the ultraviolet ray, the ultraviolet-ray transmittance thereof is reduced when the signal transfer substrate is repeatedly used. For this reason, it is impossible to use the signal transfer substrate formed of such a material repeatedly many times. This disadvantage is avoided by using the signal transfer substrate formed of a quartz glass which has resistance to the ultraviolet ray. However, when the substrate of quartz glass is used and the transfer substrate is peeled from the ultraviolet curable resin, the substrate tends to fracture or chip. When the physical break occurs in the signal transfer substrate, the substrate cannot be used repeatedly. Further, the quartz glass itself is expensive. Therefore, even if the quartz glass is used as the material for the transfer substrate, the production cost of the multilayer information recording medium is difficult to reduce. Instead, the cost may be higher.

SUMMARY OF THE INVENTION

The object of the present invention is to provide a method for producing a multilayer information recording medium which method employs a signal transfer substrate of a material having sufficient light resistance and flexibility that makes the substrate resistant to physical breakage, and allows the repeated use of the signal transfer substrate (that is, multiple ultraviolet ray irradiation operations and peeling operations).

Means to Solve the Problems

In order to achieve the object described above, the present invention provides a method for producing a multilayer information recording medium having "n" information recording layers (wherein "n" is an integer of two or more), the method including:

applying an ultraviolet curable resin on a "k"th information recording layer (wherein "k" is an integer of from 1 to (n−1));

bonding a signal transfer substrate having an inner periphery and an outer periphery and a signal-forming surface wherein a signal portion of concavo-convex shape is formed, to the ultraviolet curable resin applied on the "k"th information recording layer, with the signal-forming surface facing the ultraviolet curable resin;

forming a resin layer by curing the ultraviolet curable resin by irradiating the ultraviolet curable resin with an ultraviolet ray which is applied from the signal transfer substrate side a state where the signal transfer substrate is bonded to the ultraviolet curable resin; and peeling the signal transfer substrate from the resin layer by warping an inner periphery portion of the signal transfer substrate, wherein, as the signal transfer substrate, a substrate is used which is formed of an organic-inorganic hybrid material and is provided with a reinforcement member at the inner periphery portion thereof.

In this specification, the "organic-inorganic hybrid material" refers to an organic-inorganic composite material containing an organic component and an inorganic component, which has a structure wherein the organic component and the inorganic component are evenly distributed at a molecular level. Further, the multilayer information recording medium to be produced by the production method according to the present invention may be an information recording medium which is provided with at least two layers comprising a first information layer and a second information layer as the information recording layers. Therefore, the production method of the present invention includes the method for producing an information recording medium provided with three or more information recording layers. For example, in the production method of the multilayer information recording medium provided with three or more information recording layers, the process for forming the resin layer may be applied only to the resin layer between the first information layer and the second information layer, or only the resin layer between the second information layer and the third information layer, or both resin layers. The same is applicable to the multilayer information recording medium provided with four or more information layers.

Effect of the Invention

According to the method for producing multilayer information recording medium of the present invention, the transfer of the concavo-convex shape (the signal portion) to the resin by means of the signal transfer substrate and the peeling-off of the signal transfer substrate from the resin can be carried out well, and the signal transfer substrate can be used repeatedly multiple times. This makes it possible to reduce the cost for material required for forming one signal surface since the disposable signal transfer substrate is not necessary which has been used conventionally. Further, since a plurality of signal transfer substrates which have the same signal-forming surface are not required to be produced for producing one kind of information recording medium, a simplified and low-cost production of the multilayer information recording medium can be realized. Furthermore, the present invention makes it possible to suppress variation in the signal surface which occurs in the respective signal transfer substrates. In addition, the present invention can prevent dust generation due to the signal transfer substrate chipping.

BRIEF DESCRIPTION OF DRAWINGS

FIGS. 1(A) to 1(G) are cross-sectional views showing the respective steps in a production method of a multilayer information recording medium according to a first embodiment of the present invention.

DETAILED DESCRIPTION OF THE INVENTION

Figure 2A:
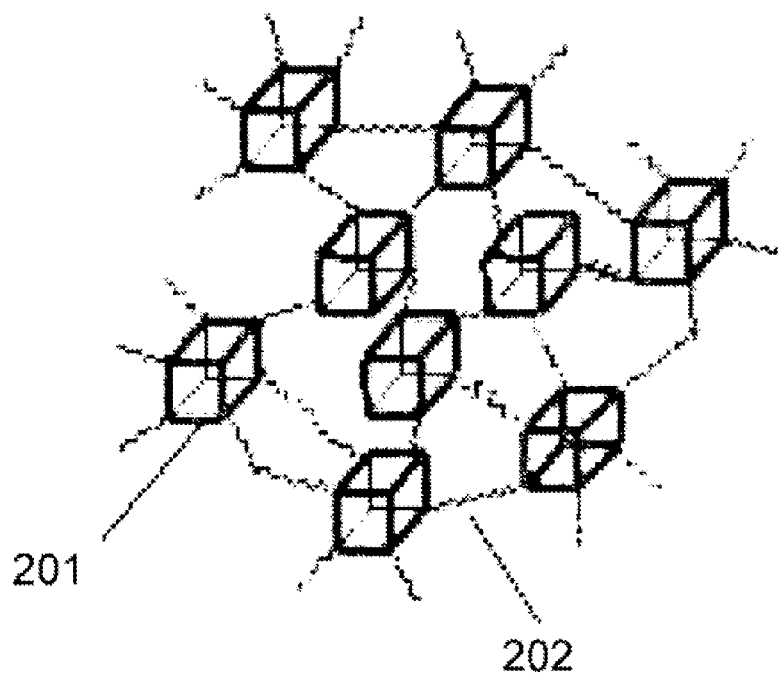
FIG. 2(A) shows a schematic view of a three-dimensional cross-linking structure of a cured silicon resin used in the first embodiment of the present invention and FIG. 2(B) shows a schematic view of an example of a structure of a polyhedral oligomeric silsesquioxane compound which constitutes the cured silicon resin used in the first embodiment of the present invention.

Embodiments of the present invention are described with reference to the drawings. It should be noted that the following description is illustrative and the present invention is not limited by the description.

[Production Method of Multilayer Information Recording Medium]

The production method for producing a multilayer information recording medium of the present invention is a method for producing a multilayer information recording medium having "n" information recording layers (wherein "n" is an integer of two or more), the method including:

applying an ultraviolet curable resin on a "k"th information recording layer (wherein "k" is an integer of from 1 to (n−1));

bonding a signal transfer substrate having an inner periphery and an outer periphery and a signal-forming surface wherein a signal portion of concavo-convex shape is formed, to the ultraviolet curable resin applied on the "k"th information recording layer, with the signal-forming surface facing the ultraviolet curable resin;

forming a resin layer by curing the ultraviolet curable resin by irradiating the ultraviolet curable resin with an ultraviolet which is applied from the signal transfer substrate side in a state where the signal transfer substrate is bonded to the ultraviolet curable resin; and peeling the signal transfer substrate from the resin layer by warping an inner periphery portion of the signal transfer substrate, wherein, as the signal transfer substrate, a substrate is used which is formed of an organic-inorganic hybrid material and is provided with a reinforcement member at the inner periphery portion thereof.

Therefore, when the multilayer information recording medium consists of two information layers, the production method of the present invention is provided as a method for producing a multilayer information recording medium including at least a first information recording layer, a second information recording layer and a resin layer disposed between the first information recording medium and the second information recording medium, wherein a step of forming the resin layer includes the steps of:

(I) applying an ultraviolet curable resin on the first information recording layer;

(II) bonding a signal transfer substrate having a signal surface in which a signal portion of concavo-convex shape is formed, to the ultraviolet curable resin applied on the first information recording layer, with the signal surface facing to the resin;

(III) forming a resin layer by curing the resin with the signal transfer substrate bonded to the resin; and (IV) peeling the signal transfer substrate from the rein layer by warping an inner periphery portion of the signal transfer substrate; and wherein the signal transfer substrate is formed of an organic-inorganic hybrid material and is provided with a reinforcement member at the inner periphery portion thereof.

The signal transfer substrate has an inner periphery and an outer periphery, that is, a central hole in a center portion thereof. The central hole may be formed in the first signal substrate. An optical disc such as a Blu-ray Disc is generally constructed such that all the layers have the central holes (that is, constructed into a donut shape).

An example of the organic-inorganic hybrid material is a material which includes an inorganic component (which may be referred to as an "inorganic segment" or an "inorganic filler") of a molecular size having a polyhedral structure constituted by —Si—O bonds and an organic component (which may be referred to as an "organic segment") which cross-links (or bonds) the inorganic components. In this specification, the "molecular size" means a size of the polyhedral structure having one side of from 0.1 nm to 20 nm. The side may be, for example, in a range of from 0.5 nm to 1.0 nm. As the inorganic component of molecular size having a polyhedral structure constituted by the —Si—O-bonds, an octasilsesquioxane compound and a dodecasilsesquioxane compound and so on are exemplified.

The signal transfer substrate formed of such an organic-inorganic hybrid material can be used repeatedly since the transmittance thereof is resistant to deterioration that is due to the ultraviolet ray irradiation. Therefore, when such signal transfer substrate is used, the cost for producing the multilayer information recording medium can be reduced. Further, since such organic-inorganic hybrid material has moderate flexibility compared to, for example, the quartz glass, the signal transfer substrate formed of such material is resistant to physically break upon peeling the substrate from the cured resin. However, the organic-inorganic hybrid material is less flexible compared to polycarbonate, and therefore the signal transfer substrate formed of the material tends to chip at a beginning point of the peeling. In order to prevent such chipping, the reinforcement member is used as described below.

As the organic-inorganic hybrid material, a cured material obtained by a hydrosilylation reaction may be used, which does not contain a polar group which interacts with a functional group contained in the resin which constitutes the resin layer of the multilayer information recording medium. For example, the cured material obtained by the hydrosilylation reaction may be given as a material which does not contain, in a system, the polar group such as —OH group, a carbonyl group or an ether group or the like which interacts with a polar group such as a carbonyl group contained in an acrylic resin which is one of ultraviolet curable resins. Since such a cured material can suppress strong adhesion between the signal transfer substrate and the acrylic resin layer due to the interaction therebetween, the signal transfer substrate can be peeled from the acrylic resin layer without physical breakage.

The organic-inorganic hybrid material may be, for example, a cured silicon resin which is obtained by curing a silicon resin composition containing a silsesquioxane compound. Since the silicon resin composition containing the silsesquioxane compound can be easily cured by polymerization, the signal transfer substrate can be easily produced using this composition.

In this embodiment, the reinforcement material is preferably formed of a material of which elastic modulus (specifically, elastic modulus in bending) is higher than that of the organic-inorganic hybrid material. The reinforcement member of such material can suppress the fracture and the chip caused by stress generated by warping the inner periphery portion of the signal transfer substrate. Specifically, for example, PET, polycarbonate, polyethylene and an ultraviolet curable resin may be preferably used as the material for the reinforcement member. The use of the reinforcement member makes it possible to suppress the deterioration of the signal transfer substrate due to the fracture of the substrate, as well as the dust generation due to the fracture.

The reinforcement member is stacked on the inner periphery portion of the signal transfer substrate and then integrated with the substrate. The region where the reinforcement member is provided is a ring-shape area from the inner periphery of the signal transfer substrate (that is, the outer periphery of the central hole formed in the transfer substrate) to a predetermined diameter. This "predetermined diameter", that is, a position of the outer periphery of the reinforcement member is preferably selected such that the ultraviolet curable resin to be formed into the resin layer does not overlap with the reinforcement member in a thickness direction of the transfer substrate when the resin is superposed on the transfer substrate. If this resin overlaps with the reinforcement member, the ultraviolet ray is blocked by the reinforcement member, which may result in insufficient cure of the resin. In general, the resin layer is concentric with the first signal substrate and formed into a ring shape having an inner diameter of from 21 mm to 46 mm and an outer diameter of from 117 mm to 120 mm in the optical disc. Therefore, the outer periphery of the inner periphery portion may be disposed on a circle which is concentric with the signal transfer substrate and has a diameter of 46 mm, or a position inside the circle (that is, closer to the center), and preferably on the circle having a diameter of 35 mm or a position inside the circle, and more preferably on the circle having a diameter of 22 mm or a position inside the circle.

The reinforcement member may be a sheet or a film having a shape and a size to cover the inner periphery portion of the signal transfer substrate. Such a reinforcement member is attached to the signal transfer substrate by an appropriate bonding means. A thickness of the sheet or the film constituting the reinforcement member is preferably, for example, 10 µm to 1000 µm, and more preferably 50 µm to 500 µm. If the thickness of the sheet or the film is too large, the reinforcement member is liable to be peeled off from the signal transfer substrate, whereby a predetermined reinforcement effect may not be obtained.

The reinforcement member is preferably bonded to the signal transfer substrate using a pressure-sensitive adhesive. The pressure-sensitive adhesive is excellent in adhesiveness between the reinforcement member and the organic-inorganic hybrid material. As other bonding means, for example, an ultraviolet curable resin (an epoxy resin and an acrylic resin), an acrylic resin, a radical polymer-based resin, and a thermosetting resin may be used. The bonding of the reinforcement member to the signal transfer substrate may be conducted before or after the adhesion of the signal transfer substrate to the resin layer. However, when the signal transfer substrate is used repeatedly, the signal transfer substrate to which the reinforcement member has been previously attached is adhered to the resin layer in the second or later transfer step.

The resin forming the resin layer is an ultraviolet curable resin. Therefore, the cure of the resin is conducted by irradiating the resin with an ultraviolet ray through the signal transfer substrate. When the resin layer is formed using the ultraviolet curable resin, a cycle time of the process can be reduced resulting in improvement of productivity, since the cure of the resin and the formation of the concavo-convex shape by transfer can be completed in a short period of time. Further, the ultraviolet curable resin can be cured positively using a light having a wavelength within a predetermined range. Therefore, the use of this resin facilitates the design of an apparatus for producing the recording medium.

The transmittance of the signal transfer substrate relative to the light having a wavelength of 250 nm to 280 nm is preferably 10% or more, and more preferably 20% or more considering the fact that the ultraviolet ray is applied to the ultraviolet curable resin after passing through the signal transfer substrate. The short-time cure of the ultraviolet curable resin can be facilitated by setting the optical transmittance of the signal transfer substrate within such a range relative to the above-mentioned wavelength range.

[Signal Transfer Substrate and Production Method Thereof]

The signal transfer substrate used in the present invention is a template for forming the signal portion in the resin layer by transfer. Therefore, the concavo-convex shape having a shape complementary to the signal surface (the pits and the guide groove and so on) to be formed in the resin layer is formed on one surface of the signal transfer substrate. In the above, this surface may be referred to as a "signal-forming surface." The signal transfer substrate is formed of the organic-inorganic hybrid material which are exemplified in the above. In the following, the construction and the production method of the signal transfer substrate is described, when the organic-inorganic hybrid material is the cured silicon resin which is obtained by curing a silicon resin composition containing a silsesquioxane compound.

As the silsesquioxane compound, a material can be used which contains at least one selected from a group consisting of polyhedral oligomeric silsesquioxane compounds represented by the following formulas (1) to (3) and partial polymers thereof.

$$(AR^1R^2SiOSiO_{1.5})_n(R^3R^4HSiOSiO_{1.5})_p \\ (BR^5R^6SiOSiO_{1.5})_q(HOSiO_{1.5})_{m-n-p-q} \quad (1)$$

$$(AR^1R^2SiOSiO_{1.5})_r(B_1R^5R^6SiOSiO_{1.5})_s \\ (HOSiO_{1.5})_{t-r-s} \quad (2)$$

$$(R^3R^4HSiOSiO_{1.5})_r(B_1R^5R^6SiOSiO_{1.5})_s \\ (HOSiO_{1.5})_{t-r-s} \quad (3)$$

In the formulas (1) to (3), "A" represents a group having a carbon-carbon unsaturated bond, "B" represents a substituted or a non-substituted saturated alkyl group or a hydroxyl group, "$B_1$" represents a substituted or a non-substituted saturated alkyl group, a hydroxyl group or a hydrogen atom, and each of $R^1$ to $R^6$ independently represents a functional group selected from a lower alkyl group, a phenyl group and a lower arylalkyl group. Herein the lower alkyl group has 1 to 10 carbon atoms, preferably 1 to 6 carbon atoms, and more preferably 1 to 2 carbon atoms. Further, in the formulas (1) to (3), "m" and "t" are integers selected from 6, 8, 10 and 12, and "n" represents an integer of 1 to (m−1), "p" represents an integer of 1 to (m−n), "q" represents an integer of 0 to (m−n−p), "r" represents an integer of 2 to t, and "s" represents an integer of 0 to (t−r). The signal transfer substrate made from such material is resistant to reduction in the optical transmittance due to the light irradiation and exhibits good peeling-off properties relative to the cured resin (particularly the ultraviolet curable resin). Further, the use of such material makes it possible to easily realize the signal transfer substrate having the above-described properties.

Among the above silsesquioxane compounds, a silsesquioxane compound containing at least one selected from a group consisting of the polyhedral oligomeric silsesquioxane compound represented by the formula (2) and a partial polymer thereof and at least one selected from a group consisting of the polyhedral oligomeric silsesquioxane compounds represented by the formula (3) and a partial polymer thereof is preferably used. This is because the signal transfer substrate having more favorable properties can be obtained.

The silicon resin composition may further contain at least one compound selected from the compounds represented by the following formulas (4) and (5).

$$HR^7R^8Si—X—SiHR^9R^{10} \quad (4)$$

$$H_2C=CH—Y—CH=CH_2 \quad (5)$$

In the formula (4), "X" represents a bifunctional group or an oxygen atom, and each of $R^7$ to $R^{10}$ independently represents an alkyl group having carbon atoms of 1 to 3 or a hydrogen atom. Further, in the formula (5), "Y" represents a bivalent organic group. In the silicon resin composition containing the silsesquioxane compound, the compounds represented by the formulas (4) and (5) function as a cross-linker, and therefore a three-dimensional cross-linked structure is effectively formed to reduce an amount of residue which is left remaining unreacted in the cured resin. As a result, the resistance to the UV irradiation of the cured silicon resin is further improved. In order to realize more favorable curing reaction, it is preferable to use a silicon resin composition containing at least one selected from a group consisting of the polyhedral oligomeric silsesquioxane compound represented by the formula (2) and a partial polymer thereof, and the compound represented by the formula (4); or a silicon resin composition containing at least one selected from a group consisting of the silsesquioxane compound represented by the formula (3) and a partial polymer thereof, and the compound represented by the formula (5).

When the group having the carbon-carbon unsaturated bond represented by "A" in the formula (1) and/or (2) is a chain hydrocarbon group having the carbon-carbon unsaturated bond at the end of the group, the reactivity of the silicon resin composition is more excellent and therefore more favorable curing reaction can be realized.

In the following, more specific embodiments of the present invention are described. In the embodiments described below, the method for producing an optical disc is illustrated, but the present invention is not limited to the production of the optical disc and is applicable to a general multilayer information recording medium such as an optical memory card.

Embodiment 1

FIGS. 1(A) to (G) are cross-sectional views showing the respective steps of the production method of a multilayer information recording medium according to Embodiment 1 of the present invention. The production method of multilayer information recording medium according to this embodiment is described with reference to these figures.

FIGS. 1(A) to (G) show a production method of Blu-ray Disc having two information layers. In this recording medium, the first signal substrate is a base which serves to suppress the warp of the disc and to increase the rigidity of the disc. The first signal substrate has a disc shape and a thickness of about 1.1 mm so as to have thickness compatibility with a CD (Compact Disc) and a DVD (Digital Versatile Disc). The first signal substrate 101 has a surface (signal surface) in which the signal portion of concavo-convex shape such as pits and guide groove is formed. Further, the first signal substrate has a central hole having a diameter of 15 mm and a diameter of the substrate is 120 mm.

A first thin film layer (the first information recording layer) 102 including a recording film and a reflective film is formed on the signal surface of the first signal substrate 101 by a method such as a sputtering method or a vapor deposition method. The first signal substrate 101 is stuck and secured to a rotatable table 103 by a centering jig (not shown) provided at the approximate center of the rotatable table 103 and a plurality of vacuum apertures (not shown) on the upper surface of the rotatable table 103, such that an amount of eccentricity of the substrate to a rotation axis of the rotatable table 103 is small (see FIG. 1(A)).

An ultraviolet curable resin 104 is applied by a dispenser at a desired radius concentrically with the first signal substrate 101 on the first thin film layer 102 on the first signal substrate 101 which is stuck and secured (see FIG. 1(B)).

Next, a step of spreading the ultraviolet curable resin 104 toward the outer periphery, that is, the formation of the thin film by a spin coat method is carried out by rotating the rotatable table 103 (see FIG. 1(C)). During the rotation, extra resin can be thrown off and bubbles can be removed by a centrifugal force exerted to the ultraviolet curable resin 104. The thickness of the ultraviolet curable resin 104 can be adjusted to a desired thickness by setting a viscosity of the resin 104, the revolution number, the period of time of the rotation, and the atmosphere during the rotation (such as a temperature and a humidity) arbitrarily.

A signal transfer substrate 105 having the signal-forming surface is overlaid on the thin film of the ultraviolet curable resin 104 such that the signal surface of the substrate 101 and the signal-forming surface of the substrate 105 are facing each other (see FIG. 1(D)). This overlaying is preferably conducted under a vacuum atmosphere in order to prevent bubbles from being formed between the signal transfer substrate 105 and the ultraviolet curable resin 104. The signal transfer substrate 105 used here is constructed by the organic-inorganic hybrid material and the reinforcement member.

The reinforcement member 105A is provided such that the member reinforces a region from the inner periphery of the signal transfer substrate 105 to the inside of an inner periphery of the area where the ultraviolet curable resin 104 and the signal transfer substrate 105 contact (that is, a position closer to the center than the inner periphery of the area). If the reinforcement member 105A is overlaid on the area where the ultraviolet curable resin 104 is provided, the ultraviolet curable resin 104 is prevented from being irradiated with the ultraviolet ray by the reinforcement member 105A. In order to avoid this, the outer periphery size of the reinforcement member 105A is set such that it is the same as or smaller than the inner periphery size of the thin film of the ultraviolet curable resin 104 (that is, the resin layer 101). The reinforcement member 105A is formed on either one or both of an upper surface (which does not contact the resin 104) and a lower surface (which contacts the resin layer 104) of the signal transfer substrate 105.

In this embodiment, a signal region of the second information layer of the Blu-ray Disc is formed of the ultraviolet curable resin 104. To this end, the ultraviolet curable resin 104 is applied to a region which is outside a position at a diameter 22 mm and the reinforcement member 105A is formed such that the outer periphery thereof is disposed inside a position at a diameter 22 mm. When the reinforcement member 105A is formed on the upper surface of the signal transfer substrate 105, a material (such as PET, polycarbonate and polyethylene and so on) of which elastic modulus is larger than that of the organic-inorganic hybrid material constituting the signal transfer substrate 105 is used.

The elastic modulus of the organic-inorganic hybrid material is generally from 60 kgf/mm$^2$ to 180 kgf/mm$^2$. Therefore, PET (which generally has the elastic modulus of about 255 kgf/mm$^2$) and polycarbonate (which generally has the elastic modulus of about 235 kgf/mm$^2$) are preferably used, when any organic-inorganic hybrid material is used. When the organic-inorganic hybrid material has the elastic modulus of about 100 kg/mm$^2$ or less, polyethylene (which generally has the elastic modulus of about 102 kgf/mm$^2$) may be used. By providing, as the reinforcement member 105A, a thin film of a material having a large elastic modulus (elastic modulus in bending) and high flexure rigidity, the inner periphery portion of the signal transfer substrate 105 is resistant to the fracture which is caused when warping the inner periphery portion of the transfer substrate 105.

The inner periphery of the reinforcement member 105A preferably coincides with the periphery of the center hole provided in the signal transfer substrate 105. This is because, as described below, the periphery and the area around the periphery of the center hole are subjected to the heaviest load due to the warp in the step of peeling the signal transfer substrate from the ultraviolet curable resin. In 105A of FIG. 1, an embodiment is shown wherein the inner periphery of the reinforcement member 105A coincides with the periphery of the center hole of the signal transfer substrate 105. In another embodiment, the reinforcement member may be formed such that the inner periphery of the reinforcement member is positioned inside the periphery of the center hole of the signal transfer substrate 105. In yet another embodiment, the reinforcement member may not have the center hole as long as the peeling of the signal transfer substrate from the resin layer is not affected. In any of the embodiments, it is desirable that the reinforcement member is formed and/or disposed such that the member is concentric with the center hole (or the center) of the signal transfer substrate 105.

In the illustrated embodiment, a pressure-sensitive adhesive is used for bonding the reinforcement member 105A to the signal transfer substrate 105. This is for the purpose of ensuring the adhesion strength between the two members.

The reinforcement member 105A can suppress the fracture or the chip caused by the stress generated when the signal transfer substrate 105 of the organic-inorganic material is warped. Further, the prevention of the fracture by the reinforcement member 105A can suppress the dust generation involved by the fracture.

When the reinforcement member is formed on the lower surface (which contacts the ultraviolet curable resin 104) of the signal transfer substrate 105, the reinforcement member is required to be made thinner than the ultraviolet curable resin 104 of which thickness is generally from 10 μm to 25 μm. However, the attachment of the sheet or the film formed of PET, polycarbonate or polyethylene is difficult when the reinforcement member is made so thin. Therefore, when the reinforcement member is attached to the lower surface of the signal transfer substrate 105, it is preferable that the substrate is formed such that the thickness of the portion where the reinforcement member is attached is small, and thus the concave portion is formed in the lower surface of the substrate 105. Then, the reinforcement member is attached to the concave portion.

A multilayer structure 106 wherein the first signal substrate 101, the first thin film layer 102, the ultraviolet curable resin 104 and the signal transfer substrate 105 are integrated is irradiated with the ultraviolet ray which is applied from the substrate 105 side to cure the resin 104 between the signal surface of the substrate 101 and the signal-forming surface of the substrate 105 (see FIG. 1E). The ultraviolet ray is applied by an ultraviolet ray irradiator 107. The signal transfer substrate 105 in this embodiment is formed of the organic-inorganic hybrid material described below and allows the ultraviolet ray to pass therethrough at a high transmittance. Therefore, a sufficient amount of ultraviolet ray reaches the ultraviolet curable resin 104. As a result, the concavo-convex shape such as pits and guide groove formed in the signal-forming surface of the signal transfer substrate 105 can be efficiently transferred in the ultraviolet curable resin 104. In this embodiment, the resin having a viscosity; for example, in a range of from 50 mPa·s to 4000 mPa·s and the signal transfer substrate 105 of a disc shape having, for example, a diameter of 120 mm, a thickness of 0.6 mm and the center hole with a diameter of 13 mm are used in order to carry out the transfer of the concavo-convex shape efficiently.

After curing the ultraviolet curable resin 104, the resin layer 110 having the signal surface (which layer can be referred to as a "second signal substrate" since this layer functions as a signal substrate for the second information layer) is formed by peeling the signal transfer substrate 105 (see FIG. 1(F)). Since the signal transfer substrate 105 is formed of the organic-inorganic hybrid material as described below, the peeling-off properties thereof relative to the cured ultraviolet curable resin 104 is excellent and the substrate 105 can be easily peeled off at the interface between the substrate 105 and the resin 104.

The peeling of the signal transfer substrate 105 is conducted using an appropriate tool. For example, when the diameter of the center hole of the signal transfer substrate 105 is smaller than that of the first signal substrate, the tool may be one which pushes the substrate 105 upwardly by applying a force to the substrate 105 from the substrate 101 side. Such a tool is, for example, a rod having a diameter "d" which satisfies 13 mm≤d≤15 mm and a conical shape at a tip thereof, which is formed of a metal such as a stainless steel or aluminum. Such a tool allows the signal transfer substrate 105 to start to warp from the inner periphery of the substrate 105, by applying the force only to the inner periphery portion of the substrate 105. The warp of the substrate 105 propagates toward the outer periphery of the substrate 105, whereby the substrate 105 is separated from the resin 104 at the interface between the ultraviolet curable resin 104 and the substrate 105. Alternatively, a tool which sucks or mechanically brings up the signal transfer substrate 105 in an upward direction in the figure may be used to peel off the substrate 105 such that the inner periphery of the substrate 105 is firstly peeled off.

A second thin film layer 108 including, for example, a recording film of phase-change type and a reflective film is formed by a method such as sputtering or vapor deposition on the signal surface of the second signal substrate 110 formed in this way. The second thin film layer 108 may be constructed so that it includes at least one layer of the reflective layer of an Ag alloy, a dielectric layer of AlN and a recording layer of TeOPd. Finally, a transparent layer 109 is formed. The transparent layer 109 may be formed by applying an ultraviolet curable resin on the second thin film layer 108 by a spin coat method and then curing the ultraviolet curable resin by applying an ultraviolet ray. The transparent layer 109 is almost transparent to the recording and reproduction light (that is, it has a high transmittance relative to the recording and reproduction light) and has a thickness of about 0.1 mm.

Next, the signal transfer substrate 105 used in this embodiment is described in detail. The signal transfer substrate 105 used in this embodiment is formed of an organic-inorganic hybrid material. The examples which may be used as the organic-inorganic hybrid material are described above. Here, an embodiment is described wherein a cured silicon resin obtained by curing a silicon resin composition containing a silsesquioxane compound is used as the organic-inorganic material.

The silsesquioxane compound in this embodiment contains, for example, at least one selected from a group consisting of the polyhedral oligomeric silsesquioxane compounds represented by the above-mentioned formulas (1) to (3) and partial polymers of the polyhedral oligomeric silsesquioxane compounds given by a partial addition reaction of these compounds (which are referred to as "polyhedral oligomeric silsesquioxanes"). The organic-inorganic compound may be consisted of only polyhedral oligomeric silsesquioxanes in this embodiment.

A specific example of the silsesquioxane compound represented by the formula (1) is, for example, tetrakis(cyclohexenylethyldimethylsiloxy)-tetrakis(dimethyl-siloxy)silsesquioxane (TCHS) represented by the following structural formula (1). This compound is the compound represented by the formula (1) wherein m=8, n=4, p=4, q=0, and $R^1$, $R^2$, $R^3$ and $R^4$ are a methyl group and A is a cyclohexene group. It should be noted that, in the structural formula (1), two silsesquioxane compounds are shown and $AR^1R^2Si$— and $R^3R^4HSiO$— are abbreviated merely as "R" for convenience. The two silsesquioxane compounds represented by the structural formula (1) are polymerized in a portion where a circle is drawn in the formula.

Structural Formula (1)

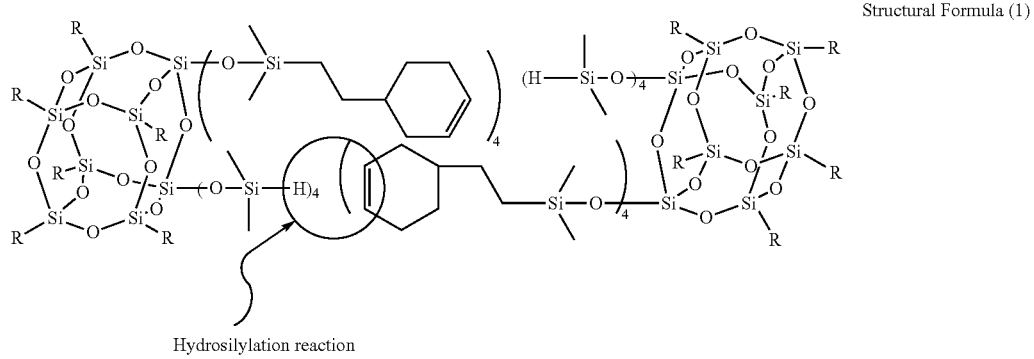

Hydrosilylation reaction

Specific examples of silsesquioxane compounds represented by the formula (2) include, for example, tetra(allyldimethylsiloxy)-tetra(trimethylsiloxy)silsesquioxane, octa(vinyldimethylsiloxy)silsesquioxane, and hexa(allyldimethylsiloxy)-dihydroxysilsesquioxane and so on.

Specific examples of the silsesquioxane compounds represented by the formula (3) include, for example, octa(hydrido)silsesquioxane and tetra(trimethyl)-tetrakis(dimethylsiloxy)silsesquioxane and so on.

The silicon resin composition in this embodiment may further contain the compound represented by the formula (4) and/or the compound represented by the formula (5), which are described above, as a cross-linker.

A specific example of the compound represented by the formula (4) is, for example, tetramethyldisiloxane or the like. As a specific example of the compound represented by the formula (5), there can be mentioned, for example, divinyltetramethyldisiloxane, diallyltetramethyldisiloxane, and divinyldiphenyldimethyldisiloxane and so on.

Figure 2B:
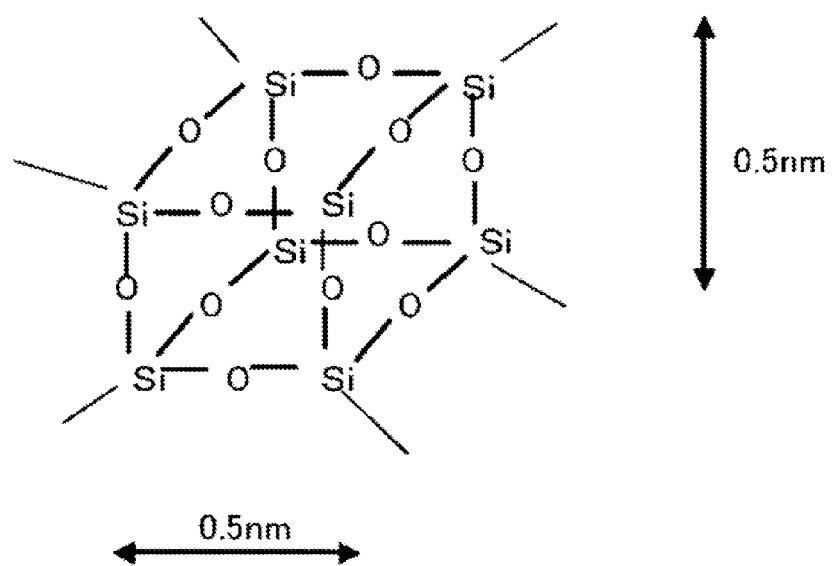

Each of FIG. 2(A) and FIG. 2(B) shows a schematic view of a three-dimensional cross-linked structure of a cured silicone resin, formed by addition polymerization between polyhedral oligomeric silsesquioxane compounds such as TCHS. FIG. 2(A) is a schematic view showing a three-dimensional cross-linked structure of a cured silicone resin formed by cross-linking a plurality of polyhedral oligomeric silsesquioxane compounds. FIG. 2(B) is a schematic view showing an example of the structure of the polyhedral oligomeric silsesquioxane compound. In FIG. 2(A), a reference numeral 201 indicates an approximately hexahedron structure formed with silicon atoms and oxygen atoms. In other words, the reference numeral 201 indicates the molecular-size (or nano-size) inorganic component having the polyhedral structure constituted by —Si—O— bonds. Further, in FIG. 2(A), a reference numeral 202 indicates the organic component (organic segment) cross-linking the approximately hexahedron structures 201. In this embodiment, the silicone resin composition is made into the cured silicone resin through the formation of the cross-linked structure as shown in FIG. 2(A), for example.

As shown in FIG. 2(B), the silsesquioxane compound has the polyhedral (approximately hexahedral) structure constituted by silicon atoms and oxygen atoms and one side thereof is of nano level (for example, 0.5 nm). Accordingly, a silicone resin composed of such a silsesquioxane compound also is called a nano resin.

The cured resin is given by a reaction of a hydrosilane group bonded to a silicon atom by a siloxane bond and a group having a carbon-carbon unsaturated bond and being bonded to a silicon atom by a siloxane bond which groups are contained in the polyhedral oligomeric silsesquioxane compound. More specifically, the hydrosilane group of one polyhedral oligomeric silsesquioxane compound of two polyhedral oligomeric silsesquioxane compounds and the group having the carbon-carbon unsaturated bond of the other polyhedral oligomeric silsesquioxane compound are hydrosilylation-reacted resulting in addition polymerization and cross-linking, and thus the cured silicon resin is obtained. At this time, the three-dimensional cross-linked structure in which, for example, the nano-size polyhedral structures (inorganic components) of the silsesquioxane compounds are connected by the organic components is formed. The cured silicone resin thus formed achieves a glass-like function and has a characteristic of being resistant to deterioration even when it is used while being irradiated with a light in a region of from blue to near-ultraviolet. When the signal transfer substrate 105 is formed of such a material, the decrease in transmittance thereof due to the irradiation of the light in a region of from blue to near-ultraviolet is suppressed. Also, the signal transfer substrate 105 is transparent with respect to a light in such a wavelength region (that is, it has a high transmittance of, for example, 50% or more).

In order to increase the toughness of the signal transfer substrate, an inorganic filler (for example, silica) may be added and mixed. For example, the filler having a particle diameter of 0.05 μm to 50 μm, preferably 0.01 μm to 1.5 μm may be added and mixed considering the facility of mixing and dispersion of the inorganic filler into the organic-inorganic hybrid composition and an optimal flexibility of the transfer substrate. The addition of such inorganic filler can improve the breaking strength and the elastic modulus of the signal transfer substrate and reduce the coefficient of thermal expansion of the substrate. However, in the present invention, the disadvantage caused by the fact that the organic-inorganic hybrid material has a small toughness and a small elastic modulus can be removed or relatively alleviated by using the reinforcement material even if such inorganic filler is not mixed in the organic-inorganic hybrid material. In that sense, the production method of the present invention makes it possible to select the organic-inorganic hybrid which is to constitute the signal transfer substrate from a wider range of compounds.

By using the signal transfer substrate produced from the cured silicone resin that is the organic-inorganic hybrid material described above, it is possible to transfer easily and favorably the concavo-convex shape such as the guide groove and the signal pits, etc. in the resin layer.

Next, difference in optical transmittance of the signal transfer substrate depending on the material is described. FIG. 3 shows the optical transmittance of each of the signal transfer substrates formed of different materials and the change in optical transmittance when varying the wavelength.

Figure 3A:
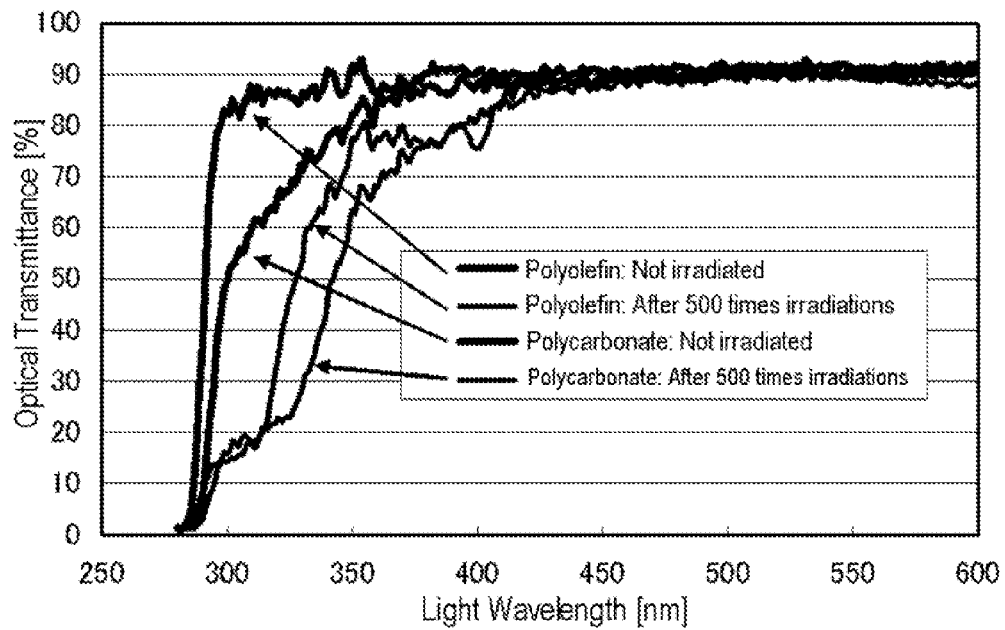
FIG. 3 is a graph which shows change in an optical transmittance of a signal transfer substrate due to an ultraviolet lay irradiation in the first embodiment of the present invention.

FIG. 3(A) shows, as a control for comparison, the change in optical transmittance when the signal transfer substrates formed of polycarbonate and polyolefin which are commonly-used materials, are irradiated with a light. The change in optical transmittance of the cured silicon resin used in the present embodiment which resin is obtained by curing the silicon resin composition containing the silsesquioxane compound (which may be referred to as the "cured silicon resin of the present embodiment") is shown in a graph of FIG. 3(B). Comparison of the two graphs clarifies the superiority of the optical transmission characteristic of the signal transfer substrate formed of the cured silicon resin of the present embodiment. All the signal transfer substrate used for determining the optical transmittance had a thickness of 0.6 mm. As the polycarbonate, "AD5503", produced by Teijin Chemicals Ltd., was used. As the polyolefin, "Zeonor 1430R1", produced by Zeon Corp., was used. As the cured silicone resin of the present embodiment, a substrate was used which was formed of a cured silicone resin obtained by cross-linking tetrakis(cyclohexenylethyldimethylsiloxy)-tetrakis(dimethyl-siloxy)silsesquioxane (TCHS) as follows.

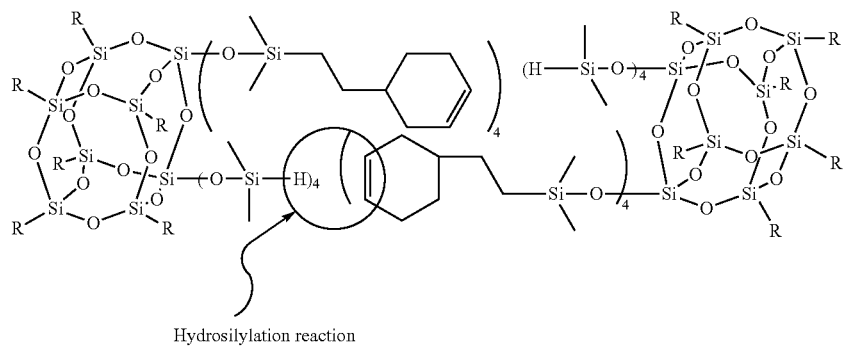

Hydrosilylation reaction

The determination of the optical transmittance was conducted using a flash-type irradiator which outputs a predetermined energy, in order to suppress the thermal change and the deformation of the signal transfer substrate as much as possible. The light intensity was set such that the ultraviolet curable resin having a thickness of 25 μm was cured when the resin is irradiated with an ultraviolet flash through the signal transfer substrate of polycarbonate, five times. Further, the optical transmittance was determined for each material for the signal transfer substrate before the irradiation of the ultraviolet ray and after 500 times ultraviolet ray flashes, in order to observe the change in optical transmittance relative to the accumulated ultraviolet ray irradiation amount. The optical transmission characteristic was determined with a recording spectrophotometer (MPC-3100) manufactured by Shimadzu Corp.

Figure 3B:
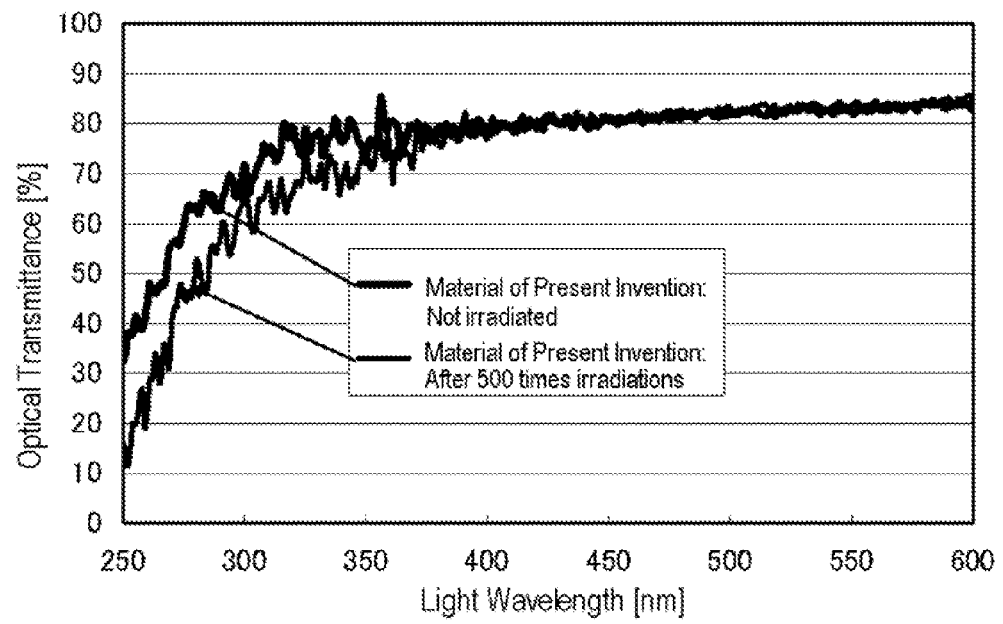

As is apparent from FIG. 3(A) and FIG. 3(B), the signal transfer substrate formed of the cured silicone resin of the present embodiment has a higher transmittance in a wavelength range of 250 nm to 280 nm than that of the signal transfer substrate formed of polycarbonate or polyolefin. This characteristic indicates that the signal transfer substrates formed of the cured silicone resin of the present embodiment has a high transmission efficiency with respect to ultraviolet ray. Accordingly, it is found that when the signal transfer substrate formed of the cured silicone resin of the present embodiment is used, the ultraviolet curable resin can be cured with a small amount of ultraviolet irradiation energy, contributing to the enhancement of the ultraviolet irradiation efficiency and the reduction of the cycle time of the process.

After flashing the ultraviolet ray 500 times, the reduction in transmittance in the ultraviolet ray region is suppressed and good optical transmittance is obtained in the signal transfer substrate formed of the cured silicon resin of the present embodiment compared to the signal transfer substrates formed from polycarbonate and polyolefin. From this characteristic, it can found that the signal transfer substrate formed of the cured silicon resin of the present embodiment can maintain almost the same ultraviolet ray transmittance as that of the initial substrate that is not irradiated with the ultraviolet ray. Further, it can be found that it is not necessary to change the irradiation amount of the ultraviolet ray which is applied in early of the ultraviolet-ray irradiation process, to cure the ultraviolet curable resin. In addition, in the case where the signal transfer substrate is formed of polycarbonate or polyolefin, the ultraviolet ray is required to be flashed 5 times for the cure of the ultraviolet curable resin. On the other hand, in the case where the signal transfer substrate formed of the cured silicon resin of the present embodiment is used, the ultraviolet curable resin can be cured by flashing the ultraviolet ray 3 times or less since the optical transmittance relative to the wavelength in a range of from 250 nm to 280 nm is 10% or more.

Figure 4:
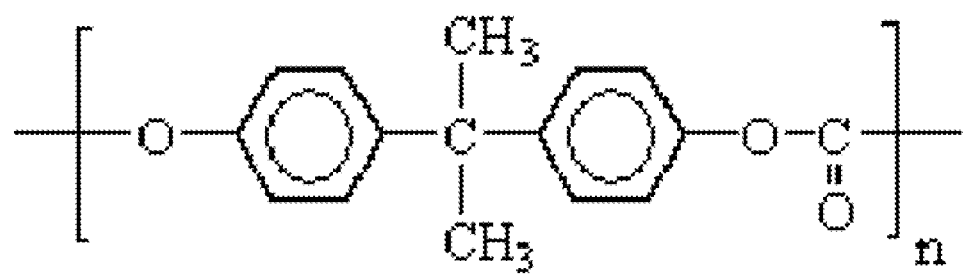
FIG. 4 is a view of a molecular structure of polycarbonate.
Figure 5:
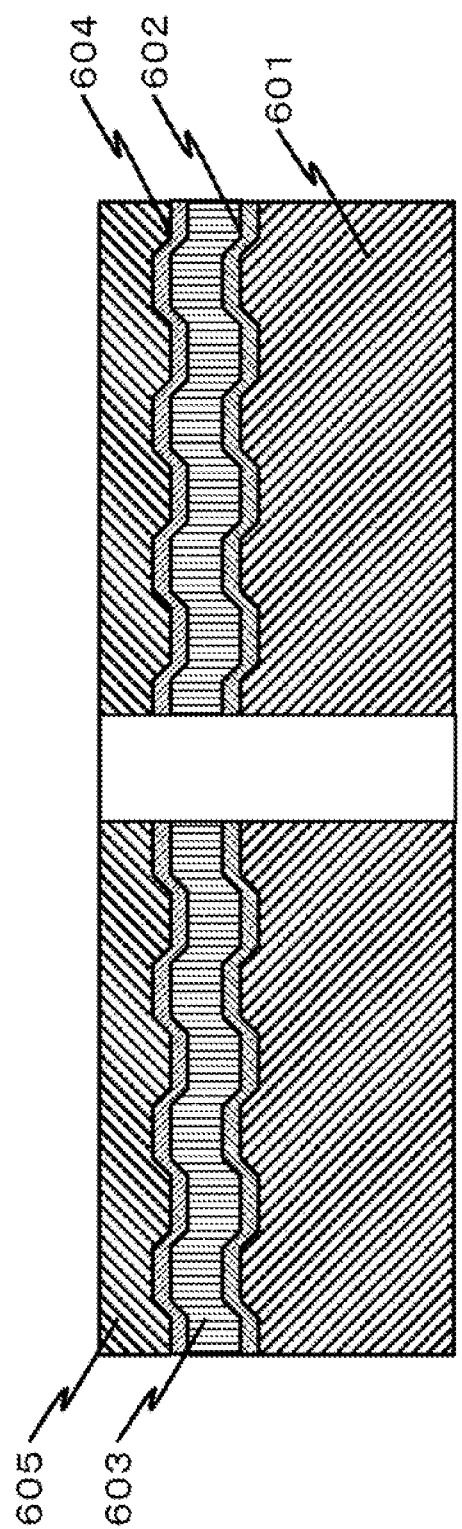
FIG. 5 is a cross-sectional view of a conventional multilayer information recording medium.
Figure 6A:
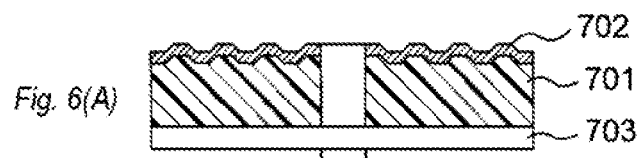
FIGS. 6(A) to 6(G) are cross-sectional views showing the respective steps in the conventional production method of multilayer information recording medium.
Figure 6B:
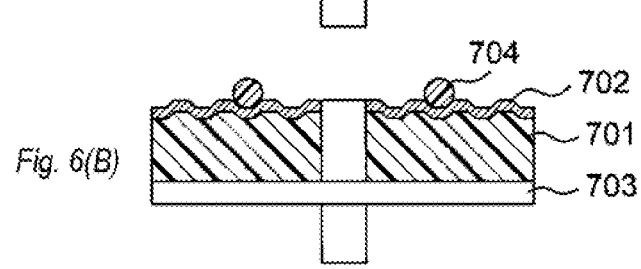
Figure 6C:
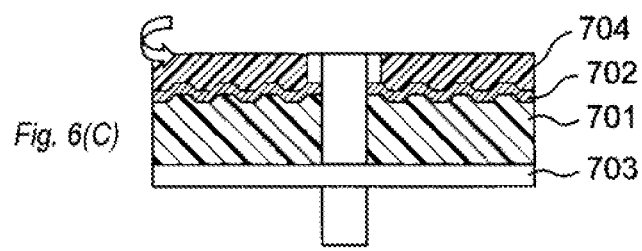
Figure 6D:
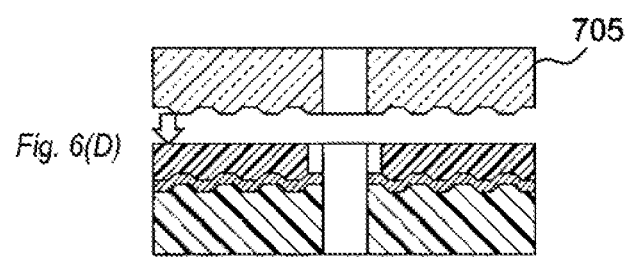
Figure 6E:
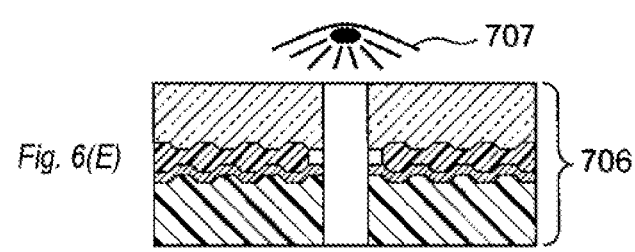
Figure 6F:
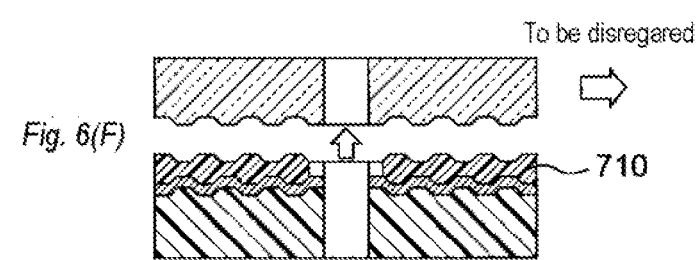
Figure 6G:
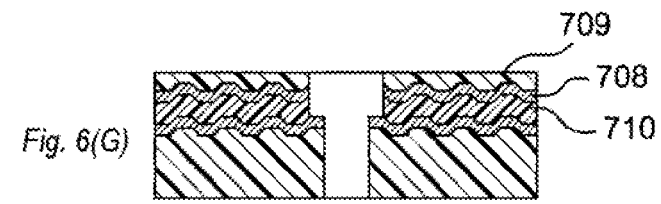

The above-described determination of the optical transmittance was conducted by applying the ultraviolet ray only to the signal transfer substrate and determining the ultraviolet-ray transmittance. When the signal transfer substrate formed of polycarbonate is actually used to form the signal surface on the ultraviolet curable resin, the substrate can be repeatedly used 20 times at most for forming good signal surface by transfer. Besides the reduced transmittance with respect to ultraviolet ray due to the ultraviolet irradiation, the reason why the separation of the signal transfer substrate made of polycarbonate is difficult is thought to be that polycarbonate contains, in its molecules, groups with a high polarity, such as —C—O— (ether bond) and C═O (carbonyl bond), as shown in FIG. 4, and these groups interact with groups with a high polarity, such as an ether group, in the ultraviolet curable resin (for example, an acrylic resin), increasing the adhesion of the signal transfer substrate with the ultraviolet curable resin. If the adhesion is too strong, it is difficult to peeling off the signal transfer substrate from the resin layer, which hinders good transfer of signal.

Also in the case where glass ($SiO_2$) was used as the material for the signal transfer substrate, the adhesion with the ultraviolet curable resin was high, and the signal surface was repeatedly transferred in a stable manner only 20 times at most. The reason is thought to be that the glass material contains groups with a high polarity, such as silanol (—SiOH) group, and these polar groups are hydrogen-bonded to polar groups, such as a carbonyl group, in the ultraviolet curable resin (for example, an acrylic resin), increasing the adhesion of the signal transfer substrate. When the glass material is used as the material for the signal transfer substrate, fracture and chip and so on are generated easily in the signal transfer substrate through repeated transfers of the signal because the glass material has, in addition to a high adhesion with the ultraviolet curable resin, characteristics of being hard and fragile.

In contrast, when the signal transfer substrate formed of the cured silicone resin of the present embodiment is used, it has been found that the signal transfer substrate has a satisfactory separability from the ultraviolet curable resin and has no problem even when the transfer is repeated 100 times or more. The cured silicone resin used for the signal transfer substrate of the present embodiment is obtained by hydrosilylation reaction of the silsesquioxane compound. Thus, this cured silicone resin does not contain, in a system thereof, groups with a high polarity (polar groups), such as an —OH group, a carbonyl group, and an ether group, and does not interact with the ultraviolet curable resin (for example, an acrylic resin). Thereby, a favorable peeling-off properties from the ultraviolet curable resin can be realized.

According to this embodiment, since the signal transfer substrate can be realized which has sufficient resistance to repeated ultraviolet-ray irradiation operations and does not generate physical break in the inner periphery portion upon being peeled off from the ultraviolet curable resin, the production method of multilayer information recording medium which enables the signal transfer substrate to be reused can be realized. Thus, it is not necessary to replace the signal transfer substrate after every signal-surface transfer operation or after the several times repeated signal-surface transfer operations, and therefore the cost for forming the signal surface by transfer can be reduced. Further, according to this embodiment, an apparatus for producing a multilayer information recording medium, which is simplified and of low cost, can be realized. Furthermore, this embodiment makes it possible to suppress the variation in signal portion caused by the replacement of the signal transfer substrate.

In this embodiment, the signal transfer substrate formed of the cured silicon resin obtained by curing the silicon resin composition containing the silsesquioxane compound was used. Even another organic-inorganic hybrid material can realize the signal transfer substrate having the same characteristic and makes it possible to use the transfer substrate repeatedly by using the reinforcement member.

INDUSTRIAL APPLICABILITY

The method for producing the multilayer information recording medium of the present invention can be utilized for producing media for any information system devices to store information, such as computers, optical disk players, optical disk recorders, car navigation systems, editing systems, data servers, AV components, memory cards, and magnetic recording media.

DESCRIPTION OF SYMBOLS 101, 701 First signal substrate
102, 702 First thin film layer (first information recording layer)
103, 703 Rotatable table
104, 704 Ultraviolet curable resin
105A Reinforcement member
105, 705 Signal transfer substrate
106, 706 Multilayer structure
107, 707 Ultraviolet ray irradiator
108, 708 Second thin film layer (second information recording layer)
109, 709 Transparent layer
110, 710 Second signal substrate (resin layer)
201 Approximately hexahedral structure (inorganic component)
202 Organic component
601 First signal substrate
602 First thin film layer
603 Second signal substrate
604 Second thin film layer
605 Transparent layer

The invention claimed is:

1. A method for producing a multilayer information recording medium having "n" information recording layers (wherein "n" is an integer of two or more), the method comprising:
   applying an ultraviolet curable resin on a "k"th information recording layer (wherein "k" is an integer of from 1 to (n−1));
   bonding a signal transfer substrate having an inner periphery and an outer periphery and a signal-forming surface wherein a signal portion of concavo-convex shape is formed, to the ultraviolet curable resin applied on the "k"th information recording layer, with the signal-forming surface facing the ultraviolet curable resin;
   forming a resin layer by curing the ultraviolet curable resin by irradiating the ultraviolet curable resin with an ultraviolet ray which is applied from the signal transfer substrate side in a state where the signal transfer substrate is bonded to the ultraviolet curable resin; and peeling the signal transfer substrate from the resin layer by warping an inner periphery portion of the signal transfer substrate,
   wherein, as the signal transfer substrate, a substrate is used which is formed of an organic-inorganic hybrid material, the substrate having an inner periphery portion defining a center hole in the substrate and is provided with a reinforcement member that is concentric to the center hole defined by the inner periphery portion of the substrate and the reinforcement member having an inner periphery portion that either coincides with or overlaps the inner periphery portion of the substrate, the organic-inorganic hybrid material comprising an inorganic component of a molecular size having a polyhedral structure constituted by —Si—O— bonds and an organic component cross-linking a plurality of the inorganic components; and
   the reinforcement member is formed of a material of which elastic modulus is larger than that of the organic-inorganic hybrid material.

2. The method for producing multilayer information recording medium according to claim 1, wherein the reinforcement material comprises at least one selected from PET, polycarbonate, polyethylene and an ultraviolet curable resin.

3. The method for producing multilayer information recording medium according to any of claim 1, wherein the reinforcement member is provided concentrically with the signal transfer substrate.

4. The method for producing multilayer information recording medium according to claim 1, wherein the reinforcement member does not overlap with an area where the ultraviolet curable resin is applied when viewing from a thickness direction of the multilayer information recording medium.

5. The method for producing multilayer information recording medium according to claim 1, wherein an outer periphery of the reinforcement member is positioned at a circle having a diameter of 22 mm which circle is concentric with the signal transfer substrate, or inside the circle when viewing from a thickness direction of the multilayer information recording medium.

6. The method for producing multilayer information recording medium according to claim 1, wherein the reinforcement member is adhered to the signal transfer substrate with a pressure-sensitive adhesive.

* * * * *